United States Patent
Nishi et al.

(10) Patent No.: US 10,286,858 B2
(45) Date of Patent: May 14, 2019

(54) PROTECTIVE CASE FOR ELECTRIC WIRES, AND SLIDING SEAT

(71) Applicants: YAZAKI CORPORATION, Tokyo (JP); HONDA MOTOR CO., LTD., Tokyo (JP)

(72) Inventors: Hiroyuki Nishi, Tochigi (JP); Daisuke Ohkawa, Saitama (JP)

(73) Assignees: YAZAKI CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/992,025

(22) Filed: May 29, 2018

(65) Prior Publication Data

US 2018/0345883 A1    Dec. 6, 2018

(30) Foreign Application Priority Data

May 30, 2017 (JP) ................. 2017-107139

(51) Int. Cl.
| | |
|---|---|
| *G06F 21/62* | (2013.01) |
| *B60R 16/02* | (2006.01) |
| *H02G 3/04* | (2006.01) |
| *B60N 2/06* | (2006.01) |
| *H02G 3/34* | (2006.01) |
| *B60R 16/027* | (2006.01) |

(52) U.S. Cl.
CPC ........... *B60R 16/0215* (2013.01); *B60N 2/06* (2013.01); *B60R 16/027* (2013.01); *H02G 3/0468* (2013.01); *H02G 3/0481* (2013.01); *H02G 3/34* (2013.01)

(58) Field of Classification Search
CPC .... B60R 16/0215; B60N 2/06; H02G 3/0468; H02G 3/34
USPC ........................................................ 174/72 A
See application file for complete search history.

(56) References Cited

U.S. PATENT DOCUMENTS

| | | | |
|---|---|---|---|
| 7,341,478 B2 * | 3/2008 | Tsubaki ................. | H02G 11/00 |
| | | | 174/72 A |
| 2006/0060370 A1 * | 3/2006 | Goto ........................ | B60N 2/06 |
| | | | 174/68.1 |

FOREIGN PATENT DOCUMENTS

| | | |
|---|---|---|
| JP | 2007-276592 A | 10/2007 |
| JP | 2016-136811 A | 7/2016 |
| JP | 2016136811 A * | 7/2016 |
| JP | 6044495 B2 * | 12/2016 |

* cited by examiner

*Primary Examiner* — Timothy J Thompson
*Assistant Examiner* — Charles Pizzuto
(74) *Attorney, Agent, or Firm* — Kenealy Vaidya LLP

(57) ABSTRACT

A protective case for electric wires includes a case body allowing a plurality of electric wires to be housed in its inside, and an electric wire fixture attached to the case body. The electric wire fixture has a plurality of connector retention portions retaining a plurality of connectors located at terminals of the electric wires extended from inside to outside through a first opening portion of the case body, and an electric wire holding portion bundling and holding a part or all of the electric wires between the first opening portion and the connector retention portions.

9 Claims, 8 Drawing Sheets

PROTECTIVE CASE FOR ELECTRIC WIRES, AND SLIDING SEAT

CROSS-REFERENCES TO RELATED APPLICATION(S)

This application is based on and claims priority from Japanese Patent Application No. 2017-107139 filed on May 30, 2017, and the entire contents of which are incorporated herein by reference.

BACKGROUND

The present invention relates to a protective case for electric wires, and a sliding seat using the protective case for electric wires.

From the viewpoint of connecting a wire harness (in particular, electric wires belonging to the wire harness) to electric equipment provided on a structure movable within a predetermined range, such as a sliding seat for a vehicle, various structures for connection between the sliding seat and the wire harness have been used in the background art.

In particular, one of the background-art connection structures has an electric wire fixture for relaying electric wires extracted from a wire harness routed on a vehicle body floor (underfloor) of a vehicle to electric wires connected to electric equipment built in a sliding seat. The electric wire fixture is rotatably installed to the vehicle body floor. When the electric wires on the two sides are connected to each other respectively, the electric wire fixture is disposed in a position where the work of the connection can be performed easily. After the work of the connection, the electric wire fixture is rotated toward a position where the electric wire fixture can be hidden under the sliding seat. Due to such a connection structure, the work of connecting the electric wires on the two sides can be performed easily.

As for details of the above grommet, refer to JP 2007-276592 A and JP 2016-136811 A.

SUMMARY

In the aforementioned background-art connection structure, looseness in each of a plurality of electric wires relayed by an electric wire fixture (hereinafter referred to as "excess length" of each electric wire) may differ from one electric wire to another due to dimensional tolerance or the like among the electric wires and connectors provided for the electric wires. In this case, in order to avoid interference between the electric wires and peripheral members, it is required to secure a space for receiving the electric wires (or a space for absorbing the excess lengths of the electric wires) around the electric wire fixture with reference to an electric wire estimated to have the longest excess length.

In fact, however, the area where components can be mounted on a vehicle body is limited, and it is required to mount as many components as possible within the limited area. On the other hand, the aforementioned space for absorbing the excess lengths of the electric wires is not essential for their original function, but the space occupies a part of the area. It is therefore preferable that the space for absorbing the excess lengths of the electric wires is as small as possible.

Further, as can be understood from the aforementioned description, it is preferable that around members connected to a plurality of electric wires, the space for absorbing the excess lengths of the electric wires is as small as possible regardless of the background-art connection structure. Particularly, when electric wires are housed inside a protective case and the electric wires are extracted from the protective case, a space for mounting the protective case itself is required in addition to the space for securing the excess lengths of the electric wires. It is therefore preferable that the space for absorbing the excess lengths of the electric wires is made smaller.

An object of the present invention is to provide a protective case for electric wires and a sliding seat, in which a plurality of electric wires can be housed in the protective case and in which a space for absorbing excess lengths of the electric wires extracted from the protective case can be reduced whether the excess lengths of the electric wires are long or short.

Embodiments of the present invention relating to the protective case provide the following items (1) and (2).

(1)

A protective case for electric wires, the protective case comprising:

a case body allowing a plurality of electric wires to be housed in its inside; and an electric wire fixture attached to the case body, the electric wire fixture having a plurality of connector retention portions retaining a plurality of connectors located at terminals of the electric wires extended from inside to outside through a first opening portion of the case body, and an electric wire holding portion bundling and holding a part or all of the electric wires between the first opening portion and the connector retention portions.

(2)

The protective case according to the item (1), further comprising a slider attached to the case body to allow its movement along the case body in a predetermined sliding direction and holding the electric wires extended from inside to outside through a second opening portion of the case body, wherein the case body has a cavity portion allowing the electric wires to change a form of the electric wires inside the case body in accordance with the movement of the slider.

According to first aspect of the invention, relating to the item (1), a plurality of connectors located at terminals of a plurality of electric wires are retained on the electric wire fixture which will be attached to the case body of the protective case. On this occasion, the electric wires may have different excess lengths between the connector retention portions and the opening portion (first opening portion) from which the electric wires are extracted from the case body. In the protective case according to the configuration, the electric wires are bundled and held between the first opening portion of the case body and the connector retention portions by the electric wire holding portion. Accordingly, in spite of a possible difference in excess length among the electric wires, it will go well only if a space corresponding to the dimensions of the electric wire holding portion is secured as a space for absorbing the excess lengths of the electric wires.

Accordingly, in the protective case according to the configuration, the space for absorbing the excess lengths of the electric wires extracted from the protective case can be reduced whether the excess lengths are long or short.

Further, as another advantage, the connectors for the electric wires extracted from the case body can be fixed to the electric wire fixture in a lump. Accordingly, if the connectors are first fixed to the electric wire fixture and the electric wire fixture is then attached to the case body, work of attaching the connectors to the case body individually can be omitted. Thus, workability on the work of fixing the connectors can be improved.

According to second aspect of the invention, relating to the item (2), the slider which can move in the sliding direction while holding the electric wires extracted from the opening portion (second opening portion) of the case body is used so that the protective case can be, for example, applied to a sliding seat of a vehicle. In particular, the electric wires held by the slider may be connected to electric equipment built in the seat of the vehicle.

Further, the cavity portion which allows the electric wires to change a form thereof in accordance with movement of the slider is provided inside the case body. Accordingly, even when the slider moves, the electric wires can be prevented from being unintentionally pushed out to the outside of the case body, and the electric wires can be prevented from being unintentionally taken into the case body.

Further, embodiments of the present invention relating to the sliding seat provide the following item (3).

(3)

A sliding seat comprising:

a seat for a vehicle configured to move in a predetermined sliding direction; and a protective case housing a plurality of electric wires corresponding to electric equipment belonging to the seat, the protective case including:

a case body allowing the electric wires to be housed in its inside;

an electric wire fixture attached to the case body, the electric wire fixture having a plurality of connector retention portions retaining a plurality of connectors located at terminals of the electric wires extended from inside to outside through a first opening portion of the case body, and an electric wire holding portion bundling and holding a part or all of the electric wires between the first opening portion and the connector retention portions; and a slider attached to the case body to allow its movement along the case body in a predetermined sliding direction and holding the electric wires extended from inside to outside through a second opening portion of the case body.

According to third aspect of the invention, relating to the item (3), a plurality of connectors located at terminals of a plurality of electric wires are retained on the electric wire fixture which will be attached to the case body of the protective case. On this occasion, the electric wires may have different excess lengths between the connector retention portions and the opening portion (first opening portion) from which the electric wires are extracted from the case body. In the sliding seat according to the configuration, the electric wires are bundled and held between the first opening portion of the case body and the connector retention portions by the electric wire holding portion. Accordingly, in spite of a possible difference in excess length among the electric wires, it will go well only if a space corresponding to the dimensions of the electric wire holding portion is secured as a space for absorbing the excess lengths of the electric wires.

Accordingly, in the sliding seat according to the configuration, the space for absorbing the excess lengths of the electric wires extracted from the protective case can be reduced whether the excess lengths are long or short.

Further, the protective case of the sliding seat according to the configuration includes the slider which can move in the sliding direction while holding the electric wires extracted from the opening portion (second opening portion) of the case body. Accordingly, the protective case can be applied to the sliding seat when the electric wires held by the slider are connected to electric equipment built in the seat of the vehicle.

As described above, according to the invention, it is possible to provide a protective case for electric wires and a sliding seat, in which a plurality of electric wires can be housed in the protective case and in which a space for absorbing excess lengths of the electric wires extracted from the protective case can be reduced whether the excess lengths of the electric wires are long or short.

Several aspects of the invention have been described briefly above. The further details of the invention will be made clearer if the following description is read through with reference to the accompanying drawings.

DETAILED DESCRIPTION

Embodiment

A protective case for electric wires according to an embodiment of the invention, and a sliding seat using the protective case will be described below with reference to the drawings.

Figure 1:
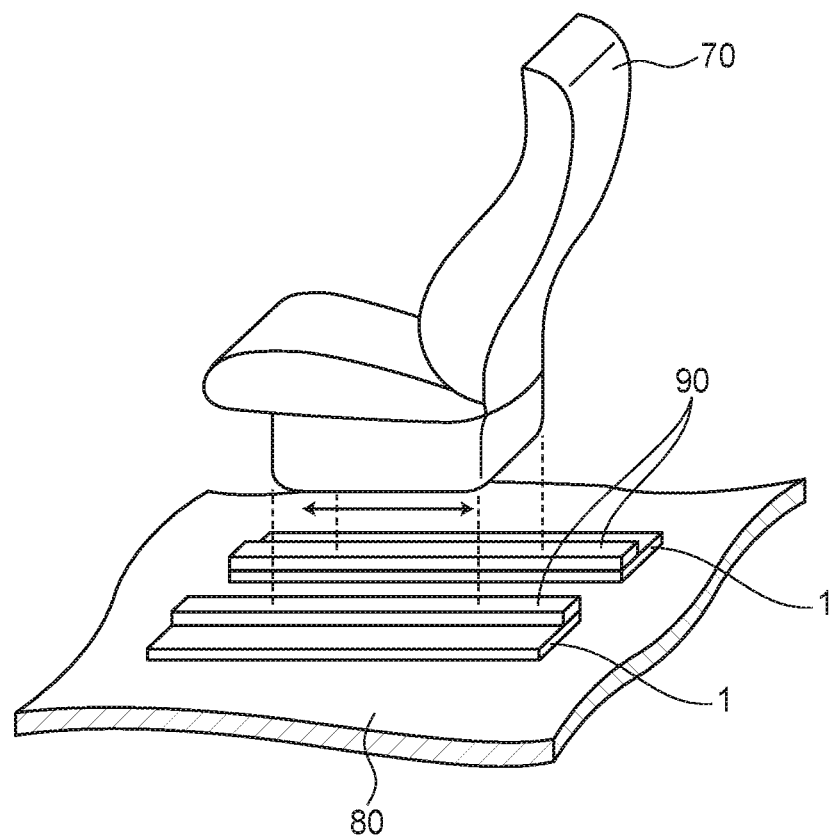
FIG. 1 is a view for explaining a mounting structure with which a sliding seat using a protective case for electric wires according to an embodiment of the invention is mounted on a floor panel of a vehicle.

As shown in FIG. 1, a protective case 1 for electric wires according to the embodiment of the invention is used in accordance with a sliding seat 70. The sliding seat 70 includes a plurality of kinds of electric equipment (not shown) such as an electric motor for adjusting the position of the seat as a whole in a front/rear direction, an electric motor for adjusting the angle of a backrest portion of the seat, etc. The sliding seat 70 is mounted on a pair of seat rails 90 movably in a front/rear direction of a vehicle. The seat rails 90 are fixed to an upper surface (vehicle interior side surface) of a floor panel 80 of the vehicle so as to extend in the front/rear direction of the vehicle.

The protective case 1 has a long shape, and is fixed to the floor panel 80 so as to extend near the pair of seat rails 90 and in the vehicle front/rear direction in accordance with the seat rails 90. The protective case 1 has a function of protecting a wire harness 60 (see FIG. 3 and so on) and a function of fixing the wire harness 60. Due to the wire harness 60, electric wires (not shown, hereinafter referred to as "floor-side electric wires) extracted from a wire harness routed on the floor panel 80 can be electrically connected (relayed) with electric wires (not shown, hereinafter referred to as "seat-side electric wires) connected to electric equipment built in the sliding seat 70.

Figure 3:
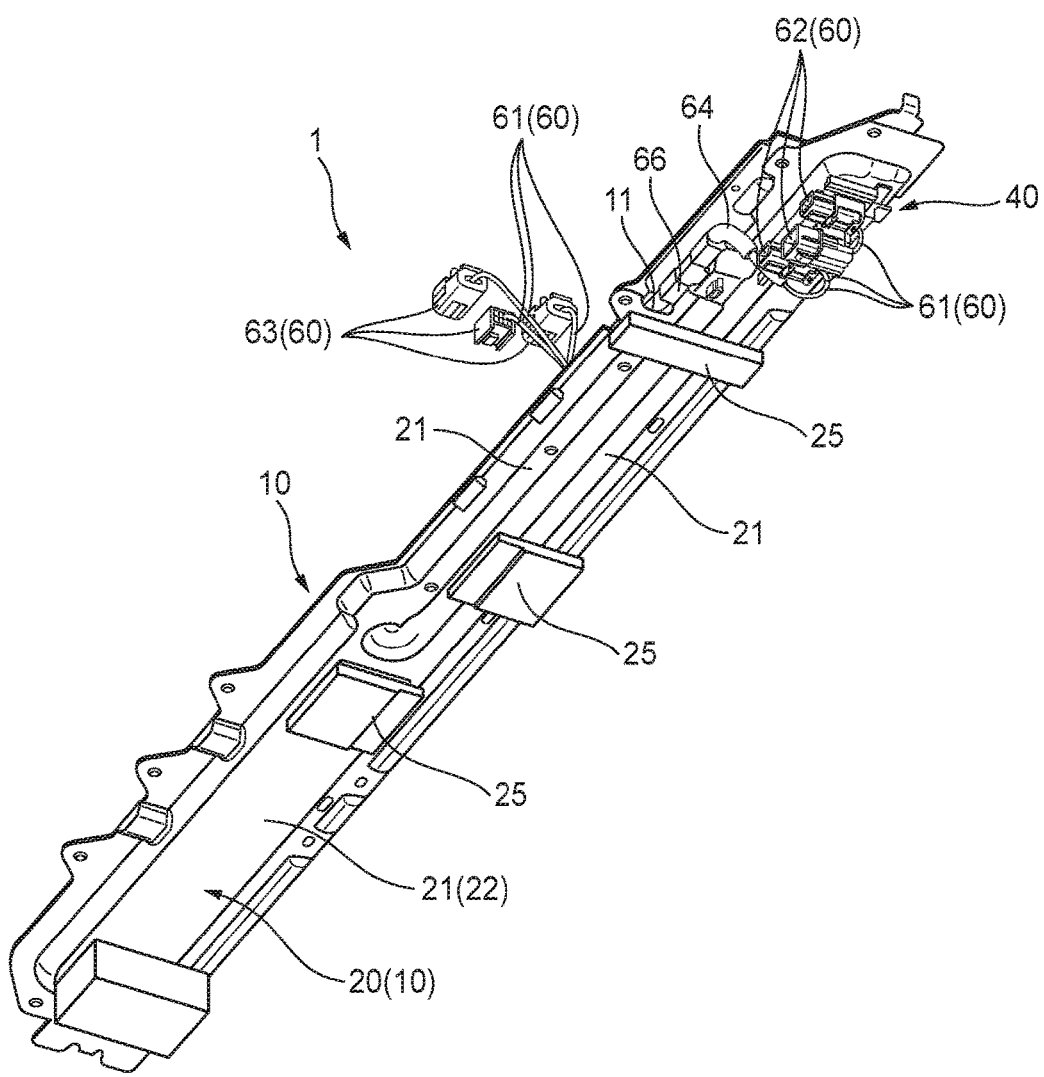
FIG. 3 is a perspective view in which the protective case is viewed from below.
Figure 4A:
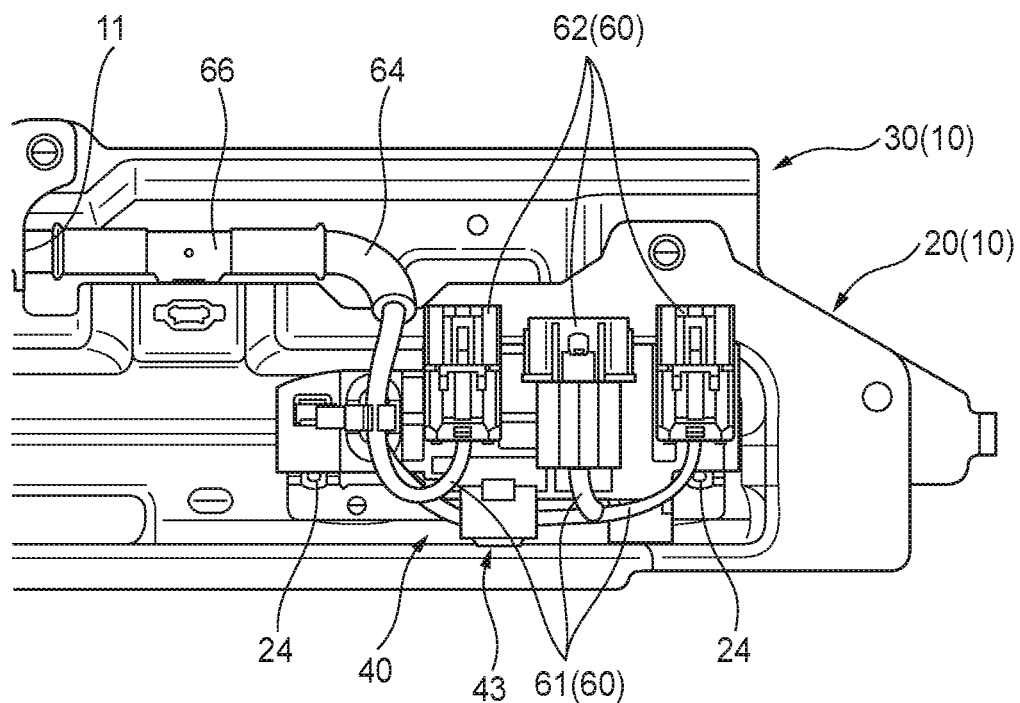
FIG. 4A is a bottom view of the protective view in which the vicinity of a bracket is enlarged.
Figure 4B:
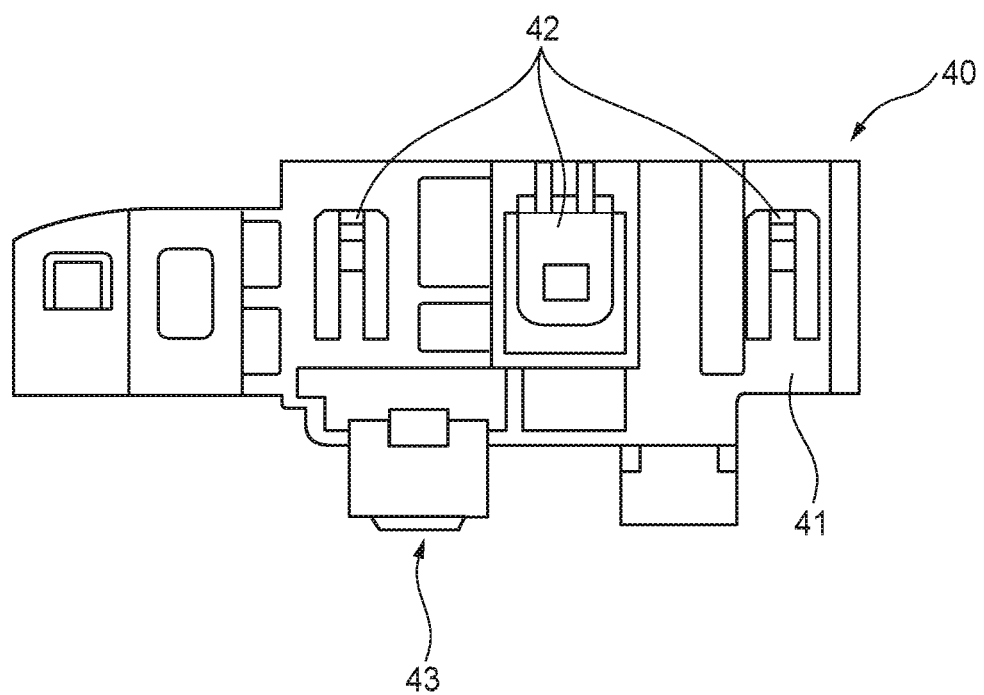
FIG. 4B is a bottom view of the bracket.

As shown in FIG. 3 and so on, the wire harness 60 has a plurality of electric wires 61, a plurality of floor-side connectors 62 attached to one-side ends of the electric wires 61 respectively, and a plurality of seat-side connectors 63 attached to the other-side ends of the electric wires 61 respectively. The floor-side connectors 62 are connected to connectors (not shown) provided in end portions of the floor-side electric wires. The seat-side connectors 63 are connected to connectors (not shown) provided in end portions of the seat-side electric wires.

Figure 2:
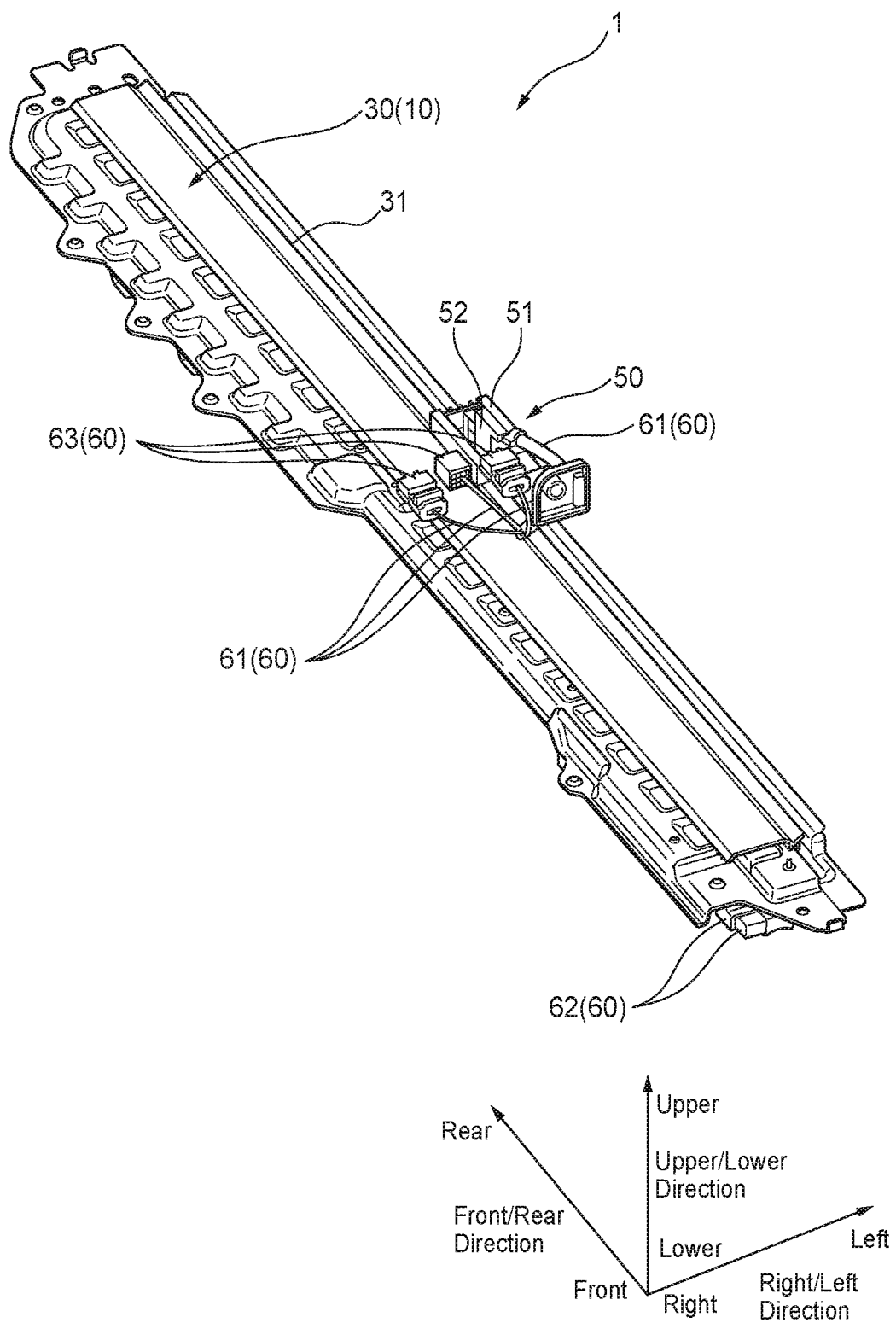
FIG. 2 is a perspective view in which the protective case is viewed from above.

The protective case 1 will be described below in detail. For convenience of explanation in the following description, a "front/rear direction", a "right/left direction", an "upper/lower direction", "front", "rear", "left", "right", "upper" and "lower" are defined as shown in FIG. 2. The "front/rear direction", the "right/left direction" and the "upper/lower direction" are perpendicular to one another.

The protective case 1 includes a case body 10 which can internally house the electric wires 61, a bracket 40 (see FIG. 3 and so on) which is fixed to the case body 10, and a slider 50 (see FIG. 2 and so on) which is supported on the case body 10 movably relatively thereto in the front/rear direction. As will be described later, the bracket 40 has a function of fixing the floor-side connectors 62 to the case body 10, and the slider 50 has a function of retaining the electric wires 61 near the seat-side connectors 63 movably relatively to the case body 10 in the front/rear direction.

First, the case body 10 will be described. The case body 10 includes a lower case 20 having a long shape and located on the lower side, and an upper case 30 having a long shape and located on the upper side (see FIGS. 2, 3 and 7A to 7C, etc.). The lower case 20 mainly has a function of housing the electric wires 61 so as to form the electric wires 61 into a predetermined shape in which the electric wires 61 should be routed. The upper case 30 mainly has a function of covering the electric wires 61 housed in the lower case 20 so as to prevent the electric wires 61 from being exposed to the outside.

In a state where a mating surface of an upper outer edge portion of the lower case 20 and a mating surface of a lower outer edge portion of the upper case 30 have been brought into contact with each other, the outer edge portions of the lower case 20 and the upper case 30 are fastened and fixed to each other by a predetermined fastening member (bolt or the like). Thus, the case body 10 is completed.

Figures 7A, 7B, 7C:
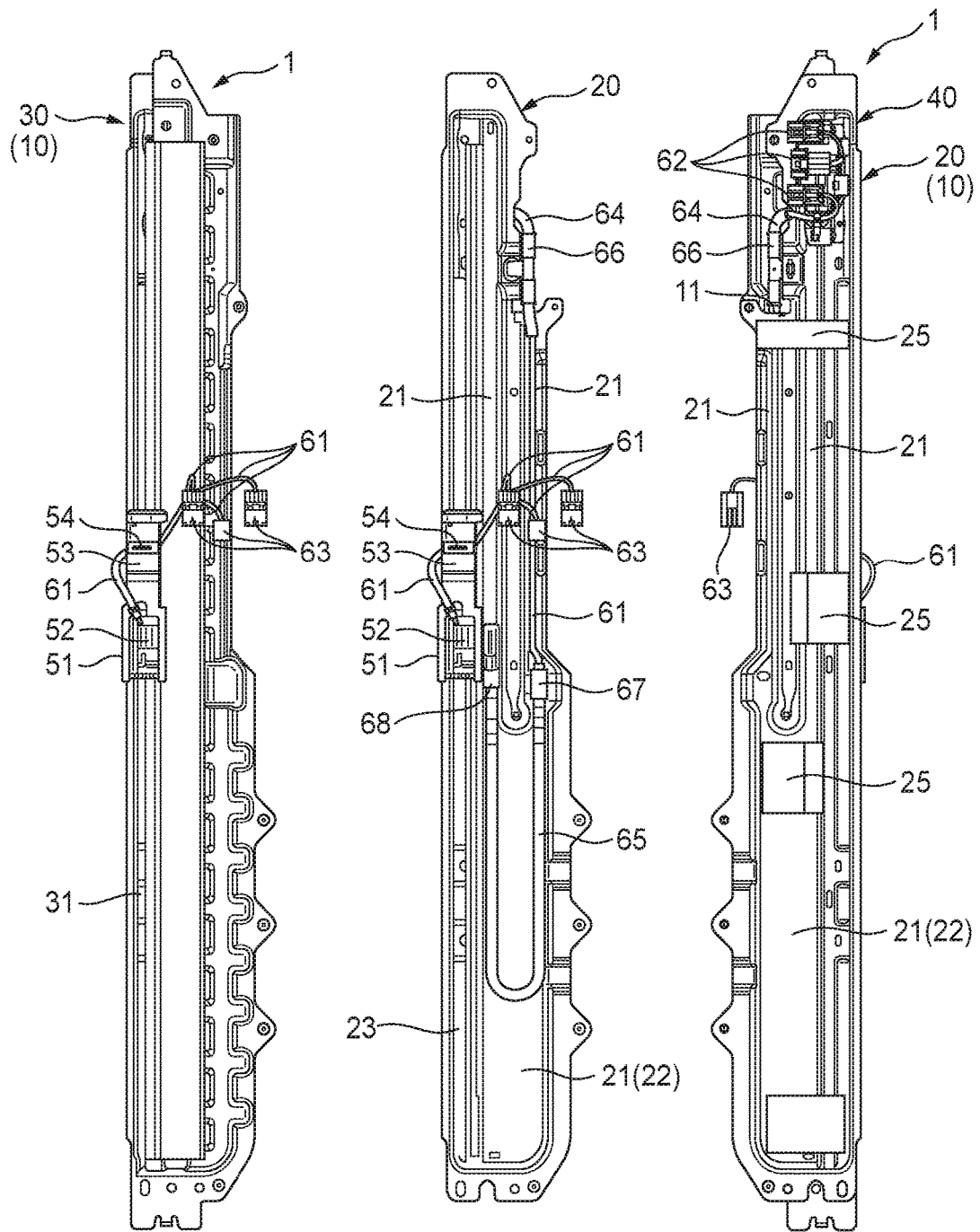
FIG. 7A is a top view of the protective case.
FIG. 7B is a top view of the protective case in which an upper case has been removed.
FIG. 7C is a bottom view of the protective case.

As shown in FIG. 3 and FIGS. 7B and 7C, an electric wire housing portion 21 for housing (receiving) the electric wires 61 is provided in the lower case 20. As can be understood from FIG. 3, the electric wire housing portion 21 is formed as a U-shaped concave portion which is recessed downward, opened frontward and extended in the front/rear direction. Accordingly, following the electric wire housing portion 21 inside the case body 10, the electric wires 61 are routed in a U-shape opened frontward and extending in the front/rear direction (FIG. 7B).

Right front end parts of the electric wires 61 routed in the U-shape inside the case body 10 are extended from the inside of the case body 10 to the outside through a first opening portion 11 (see FIG. 3 and FIG. 7C) formed in the case body 10, and connected to the floor-side connectors 62. Left front end parts of the electric wires 61 routed in the U-shape inside the case body 10 are extended from the inside of the case body 10 to the outside through a slider body 51 of the slider 50 and a slit 31 (second opening portion) of the upper case 30, and connected to the seat-side connectors 63.

A corrugated tube 64 is provided in, of the electric wires 61 extended from the first opening portion 11 to the outside of the case body 10, parts in the vicinity of the first opening portion 11, so that the outer circumference of the parts can be covered with the corrugated tube 64. Of the electric wires 61, the parts where the corrugated tube 64 is provided are fixed to the lower case 20 by a fixture 66 (see FIG. 3, FIGS. 4A, 4B and FIG. 7C).

A corrugated tube 65 is provided in, of the electric wires 61 routed in the U-shape inside the case body 10, parts (a bent part of the U-shape) whose form can vary in accordance with movement of the slider 50 in the front/rear direction. Right end portions of the parts of the electric wires 61 where the corrugated tube 65 is provided are fixed to the lower case 20 through a fixture 67 (see FIG. 7B). Left end portions of the parts of the electric wires 61 where the corrugated tube 65 is provided are fixed to the slider body 51 through a fixture 68 (see FIG. 7B).

Figure 8A:
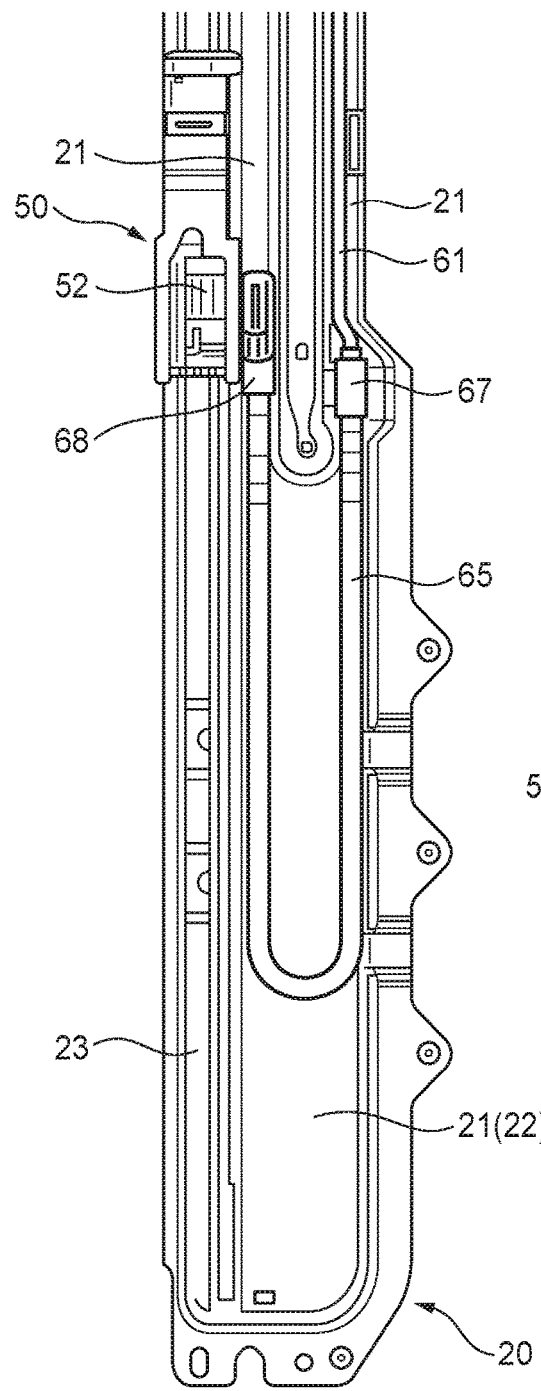
FIG. 8A and FIG. 8B are views for explaining a change in form of a wire harness inside the protective case when a slider is sliding.
Figure 8B:
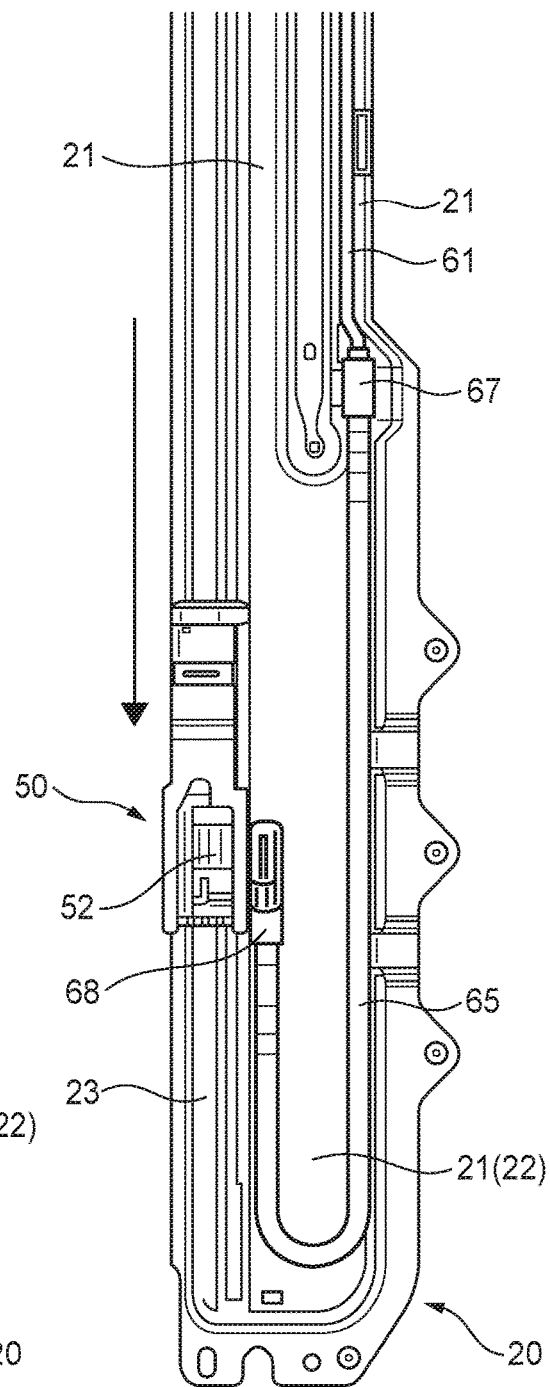

Of the electric wire housing portion 21, a pair of parts extending in the front/rear direction (that is, straight parts of the U-shape) have a width (dimension in the right/left direction) corresponding to the size of the electric wires 61. On the other hand, of the electric wire housing portion 21, a part on the rear end side (that is, on the U-shaped bent side) has a width expanded largely in the front/rear direction so as to extend in the front/rear direction. The part expanded in width serves as a cavity portion 22 which allows a change in the form of the electric wires 61 (in particular, the parts where the corrugated tube 65 is provided) inside the case body 10 in accordance with the movement of the slider 50 in the front/rear direction, as shown in FIGS. 8A and 8B.

As shown in FIG. 7B, a groove 23 recessed downward and extending in the front/rear direction is formed near the left edge portion of the lower case 20 extending in the front/rear direction. The groove 23 has a function of supporting the slider 50 movably in the front/rear direction (as will be described in detail later).

As shown in FIG. 2 and FIG. 7A, a slit 31 (through hole) extending in the front/rear direction all over the length of the upper case 30 in the front/rear direction is provided near the left edge portion of the upper case 30 extending in the front/rear direction. The slit 31 also has a function of supporting the slider 50 movably in the front/rear direction (as will be described in detail later), in the same manner as the groove 23.

Next, the bracket 40 will be described. As shown in FIG. 3 and FIG. 7C, the bracket 40 made of resin is provided near the front end portion of the lower surface of the lower case 20. The bracket 40 mainly has a function of fixing a plurality (three in this embodiment) of floor-side connectors 62.

As shown in FIGS. 4A and 4B to 6, a plurality (three in this embodiment) of connector retention portions 42 for fixing the floor-side connectors 62 respectively are provided in a bracket body 41 of the bracket 40. The floor-side connectors 62 are fixed to the connector retention portions 42 respectively (see FIG. 6). One of known structures may be used as a specific structure for fixing the floor-side connectors 62.

Figure 5:
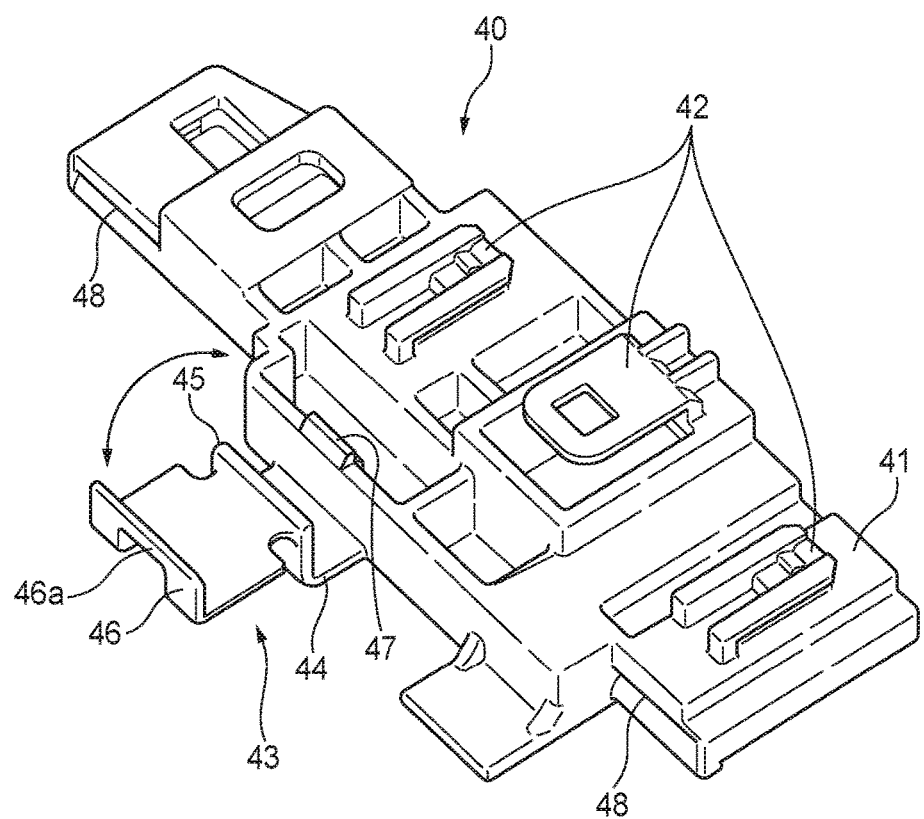
FIG. 5 is a perspective view in which the bracket is viewed from below.

An electric wire holding portion 43 for bundling and holding a plurality of the electric wires 61 near a plurality of the floor-side connectors 62 is provided in the bracket body 41. As shown in FIG. 5, the electric wire holding portion 43 has a stay 44 extending in an L-shape from the left side surface of the body 41, and a cover 46 provided for the stay 44 openably/closably with a hinge portion 45 as a fulcrum. The hinge portion 45 is located in a front end portion of the stay 44. When a lock hole 46a provided in the cover 46 is locked to a lock protrusion 47 on the body 41 side, the cover 46 can be retained in a closed position.

In the state where the cover 46 is in the open position, a plurality of the electric wires 61 extending from the first opening portion 11 and located near the floor-side connectors 62 are bundled and inserted into an internal space of the stay 44, and the cover 46 is then kept in the closed position. Thus, the electric wires 61 can be bundled and held in a space between the cover 46 and the stay 44 (see FIG. 6). In this manner, the electric wires 61 are bundled and held between the opening portion 11 and the connector retention portions 42 by the electric wire holding portion 43. In this embodiment, of the three electric wires 61, two electric wires 61 are bundled and held by the electric wire holding portion 43.

Here, there may be a difference in excess length among the electric wires 61 between the connector retention portions 42 and the first opening portion 11 where the electric wires 61 are extracted from the case body 10. With respect to this point, in the protective case 1, the electric wires 61 are bundled and held by the electric wire holding portion 43 between the first opening portion 11 of the case body 10 and the connector retention portions 42. Accordingly, it will go well only if a space corresponding to the dimensions of the electric wire holding portion 43 is secured as a space for absorbing the excess lengths of the electric wires 61 even when there is a difference in excess length among the electric wires 61.

In the opposite end portions of the bracket body 41 in the front/rear direction, a pair of fixing holes 48 are provided to be open to the left. A pair of arms 24 (see FIG. 6) provided near the front end portion of the lower surface of the lower case 20 and extending to the right are inserted into the pair of fixing holes 48 respectively. Thus, the bracket body 41 (and hence the bracket 40) can be fixed to the lower case 20 (and hence the case body 10).

Here, when the floor-side connectors 62 are fixed to the connector retention portions 42 of the bracket 40 and the bracket 40 is then attached to the case body 10, workability on the work of fixing the floor-side connectors 62 can be improved in comparison with a case where the floor-side connectors are attached to the case body 10 individually. In this manner, the floor-side connectors 62 are fixed to the case body 10 through the bracket 40.

Next, the slider 50 will be described. As shown in FIG. 2 and FIGS. 7A, 7B and 7C, the slider 50 is provided with a box-like slider body 51 internally having a hole portion 52 opened upward, and a stay 53 extending frontward from a front part of an upper edge portion of the slider body 51. The stay 53 is provided with a through hole 54.

A first fitting portion (not shown) which can be fitted to the groove 23 of the lower case 20 is provided in the bottom wall (lower wall) of the slider body 51. A second fitting portion (not shown) which can be fitted to the slit 31 provided in the upper case 30 is provided at a central position of the slider body 51 in the upper/lower direction. When the first and second fitting portions are fitted to the groove 23 and the slit 31, the slider body 51 (and hence the slider 50) is supported movably only in the front/rear direction relatively to the case body 10.

Of the electric wires 61 routed in the U-shape inside the case body 10, parts fixed to the slider body 51 by the fixture 68 (see FIG. 7B) enter the hole portion 52 through a through hole (not shown) provided in, of the right side wall of the slider body 51, a part located on the lower side from the upper case 30 (slit 31). The parts entering the hole portion 52 pass through the hole portion 52 (and hence the slit 31) and extend to the outside from the upper opening of the hole portion 52.

The electric wires 61 thus extending to the outside pass through the through hole 54 from the upper side to the lower side, and extend up to the seat-side connectors 63. In this manner, the electric wires 61 near the seat-side connectors 63 are retained movably in the front/rear direction relatively to the case body 10 by the slider 50.

Using stays 25 (see FIG. 3 and FIG. 7C) provided at a plurality (three in this embodiment) of places in the lower surface of the lower case 20, the protective case 1 in which the wire harness 60 has been routed thus is fixed to the floor panel 80 so as to extend along the front/rear direction of the vehicle near the seat rails 90 (see FIG. 1). Then, the floor-side connectors 62 are connected to connectors (not shown) provided in end portions of floor-side electric wires, and the seat-side connectors 63 are connected to connectors (not shown) provided in end portions of seat-side electric wires. Thus, the floor-side electric wires and the seat-side electric wires are electrically connected to each other respectively so that electric equipment built in the sliding seat 70 can achieve its functions.

In addition, when the sliding seat 70 moves in the front/rear direction relatively to the floor panel 80, the slider 50 moves freely (passively) in accordance with the movement of the sliding seat 70 (and hence the movement of the seat-side connectors 63). Thus, there is no fear that overload may be applied to connection parts between the seat-side connectors 63 and the connectors provided in the end portions of the seat-side electric wires.

According to the protective case 1 for the wire harness 60 and the sliding seat 70 according to the embodiment, as has been described above, a plurality of floor-side connectors 62 at terminals of a plurality of electric wires 61 are retained on the bracket 40 which will be attached to the case body 10 of the protective case 1. On this occasion, the electric wires 61 may have different excess lengths between the connector retention portions 42 and the first opening portion 11 from which the electric wires 61 are extracted from the case body 10. With respect to this point, in the protective case 1, the electric wires 61 are bundled and held between the first opening portion 11 of the case body 10 and the connector retention portions 42 by the electric wire holding portion 43.

Accordingly, in spite of a possible difference in excess length among the electric wires, it will go well only if a space corresponding to the dimensions of the electric wire holding portion 43 is secured as a space for absorbing the excess lengths of the electric wires 61. That is, the protective case 1 can be used in no consideration of whether the excess length of each electric wire 61 is long or short. Thus, the space for absorbing the excess lengths of the electric wires 61 extracted from the protective case 1 can be reduced whether the excess lengths of the electric wires 61 are long or short.

Further, as another advantage, a plurality of floor-side connectors 62 located at terminals of a plurality of electric wires 61 extracted from the case body 10 can be fixed to the bracket 40 in a lump. Accordingly, if the floor-side connectors 62 are first fixed to the bracket 40 and the bracket 40 is then attached to the case body 10, workability on work of attaching the floor-side connectors 62 to the case body 10 can be improved in comparison with a case where the floor-side connectors 62 are attached to the case body 10 individually.

Further, the slider 50 which can move in the front/rear direction while holding the electric wires 61 extracted from the slit 31 (second opening portion) of the case body 10 is used so that the protective case 1 can be applied to the sliding seat 70 of a vehicle. In particular, the electric wires 61 held by the slider 50 may be connected to connectors (not shown) provided in end portions of seat-side electric wires.

Further, the cavity portion 22 which allows the electric wires 61 to change a form thereof in accordance with movement of the slider 50 is provided inside the case body 10. Accordingly, even when the slider 50 moves, the electric wires 61 can be prevented from being unintentionally pushed out to the outside of the case body 10, and the electric wires 61 can be prevented from being unintentionally taken into the case body 10.

Other Embodiments

The present invention is not limited to any of the aforementioned embodiments, but various modifications may be made within the scope of the invention.

For example, in the aforementioned embodiment, the slider 50 is provided in the protective case 1 so that the protective case 1 can be used in accordance with the sliding seat 70. However, the slider 50 does not have to be provided in the protective case 1 when the protective case 1 is used in accordance with not a movable body such as the sliding seat 70 but a fixed structure.

Figure 6:
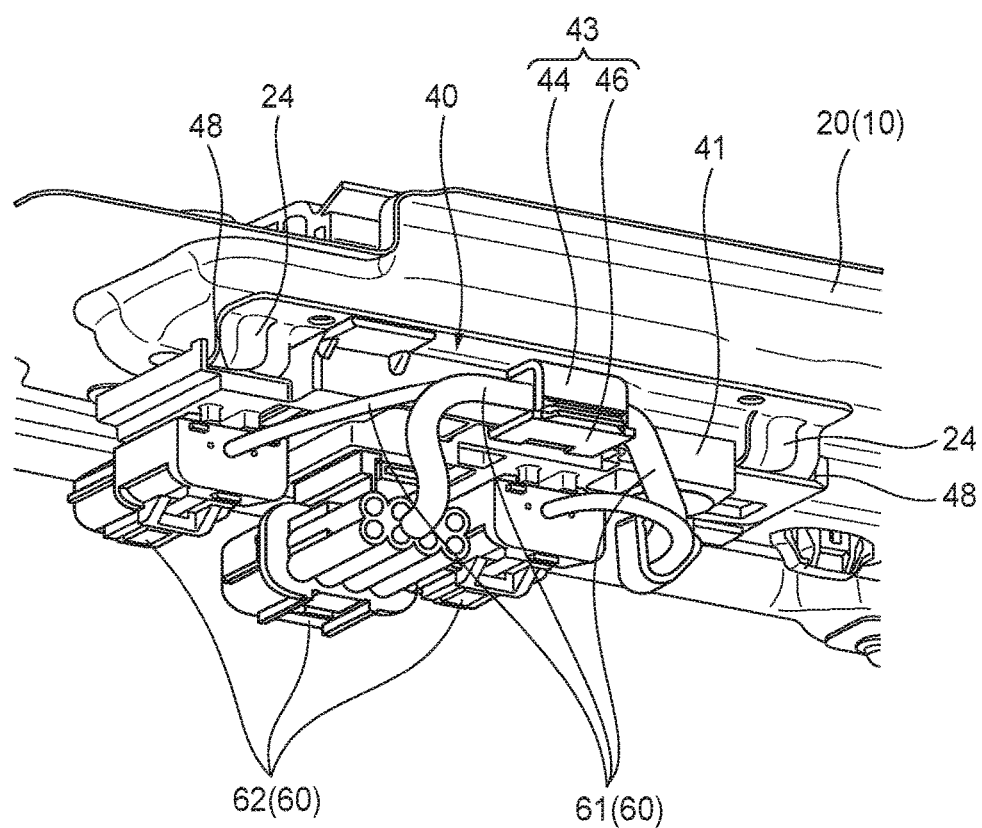
FIG. 6 is a perspective view of the protective case in which the vicinity of the bracket is enlarged.

Further, in the aforementioned embodiment, parts (two) of a plurality (three) of electric wires 61 are held by the electric wire holding portion 43 (see FIG. 6). However, all (three) of the plurality (three) of electric wires 61 may be held by the electric wire holding portion 43.

Moreover, in the aforementioned embodiment, the case body 10 is constituted by the lower case 20 and the upper case 30. However, the case body 10 may be formed integrally as a whole. Furthermore, in the aforementioned embodiment, both the connector retention portions 42 and the electric wire holding portion 43 of the bracket 40 are formed integrally with the bracket body 41. However, the connector retention portions 42 and the electric wire holding portion 43 may be provided respectively in different bracket bodies separated from each other.

Here, the features of the aforementioned embodiments of the protective case for electric wires and the sliding seat according to the invention will be summarized and listed briefly in the following items [1] to [3].

[1] A protective case (1) for electric wires, the protective case comprising:

a case body (10) allowing a plurality of electric wires (61) to be housed in its inside; and an electric wire fixture (40) attached to the case body, the electric wire fixture (40) having a plurality of connector retention portions (42) retaining a plurality of connectors (62) located at terminals of the electric wires (61) extended from inside to outside through a first opening portion (11) of the case body, and an electric wire holding portion (43) bundling and holding a part or all of the electric wires (61) between the first opening portion (11) and the connector retention portions (42).

[2] The protective case according to the item [1], further comprising a slider (50) attached to the case body (10) to allow its movement along the case body in a predetermined sliding direction and holding the electric wires (61) extended from inside to outside through a second opening portion (31) of the case body, wherein the case body has a cavity portion (22) allowing the electric wires to change a form of the electric wires inside the case body in accordance with the movement of the slider.

[3] A sliding seat comprising:

a seat (70) for a vehicle configured to move in a predetermined sliding direction; and a protective case (1) housing a plurality of electric wires (61) corresponding to electric equipment belonging to the seat, the protective case including:

a case body (10) allowing the electric wires to be housed in its inside;

an electric wire fixture (40) attached to the case body, the electric wire fixture having a plurality of connector retention portions (42) retaining a plurality of connectors (26) located at terminals of the electric wires (61) extended from inside to outside through a first opening portion (11) of the case body, and an electric wire holding portion (43) bundling and holding a part or all of the electric wires between the first opening portion (11) and the connector retention portions (42); and a slider (50) attached to the case body to allow its movement along the case body in a predetermined sliding direction and holding the electric wires extended from inside to outside through a second opening portion (31) of the case body.

REFERENCE SIGNS LIST

1 protective case for electric wires
10 case body
11 first opening portion
22 cavity portion
31 slit (second opening portion)
40 bracket (electric wire fixture)
42 connector retention portion
43 electric wire holding portion
50 slider
60 wire harness
61 electric wire
62 floor-side connector (connector)
63 seat-side connector
70 sliding seat (seat)

The invention claimed is:

1. A protective case for electric wires, the protective case comprising:
    a case body allowing a plurality of electric wires to be housed in its inside; and an electric wire fixture attached to the case body,
    the electric wire fixture having a plurality of connector retention portions, the plurality of connector retention portions retaining a plurality of connectors located at terminals of the electric wires extended from inside the case body to outside the case body through a first opening portion of the case body and fixing the plurality of connectors to the case body, and an electric wire holding portion bundling and holding a part or all of the electric wires between the first opening portion and the connector retention portions.

2. The protective case according to claim 1, further comprising
    a slider attached to the case body to allow its movement along the case body in a predetermined sliding direction and holding the electric wires extended from inside the case body to outside the case body through a second opening portion of the case body, wherein the case body has a cavity portion allowing the electric wires to change a form of the electric wires inside the case body in accordance with the movement of the slider.

3. The protective case for electric wires according to claim 1, wherein the connectors are fixed to the connector retention portions.

4. The protective case for electric wires according to claim 1, wherein the electric wire holding portion has a cover provided to be retained in closed and opened positions.

5. The protective case for electric wires according to claim 4, wherein a part or all of the electric wires between the first opening portion and the connector retention portions are inserted into the electric wire holding portion with the cover in the opened position and held in the electric wire holding portion with the cover in the closed position.

6. A sliding seat comprising:

a seat for a vehicle configured to move in a predetermined sliding direction; and a protective case housing a plurality of electric wires corresponding to electric equipment belonging to the seat, the protective case including:

a case body allowing the electric wires to be housed in its inside;

an electric wire fixture attached to the case body, the electric wire fixture having a plurality of connector retention portions retaining a plurality of connectors located at terminals of the electric wires extended from inside the case body to outside the case body through a first opening portion of the case body and fixing the plurality of connectors to the case body, and an electric wire holding portion bundling and holding a part or all of the electric wires between the first opening portion and the connector retention portions; and a slider attached to the case body to allow its movement along the case body in a predetermined sliding direction and holding the electric wires extended from inside to outside through a second opening portion of the case body.

7. The protective case for electric wires according to claim 6, wherein the connectors are fixed to the connector retention portions.

8. The protective case for electric wires according to claim 6, wherein the electric wire holding portion has a cover provided to be retained in closed and opened positions.

9. The protective case for electric wires according to claim 8, wherein a part or all of the electric wires between the first opening portion and the connector retention portions are inserted into the electric wire holding portion with the cover in the opened position and held in the electric wire holding portion with the cover in the closed position.

* * * * *